(12) United States Patent
Ou

(10) Patent No.: US 10,165,757 B2
(45) Date of Patent: Jan. 1, 2019

(54) SCARFING TYPE SCRATCHING PAD

(71) Applicant: Wei-Ting Ou, New Taipei (TW)

(72) Inventor: Wei-Ting Ou, New Taipei (TW)

(*) Notice: Subject to any disclaimer, the term of this patent is extended or adjusted under 35 U.S.C. 154(b) by 154 days.

(21) Appl. No.: 15/203,488

(22) Filed: Jul. 6, 2016

(65) Prior Publication Data

US 2017/0006830 A1    Jan. 12, 2017

(30) Foreign Application Priority Data

Jul. 9, 2015 (TW) ............................. 104211088 U

(51) Int. Cl.
*A01K 15/02*    (2006.01)

(52) U.S. Cl.
CPC .................................. *A01K 15/024* (2013.01)

(58) Field of Classification Search
CPC .................................................. A01K 15/024
USPC ....... 119/616, 625, 702, 703, 706, 600, 612, 119/615; 132/76.4
See application file for complete search history.

(56) References Cited

U.S. PATENT DOCUMENTS

| 7,011,043 B2* | 3/2006 | Diep .................... A01K 15/024 119/601 |
| 7,647,893 B2* | 1/2010 | Kraus .................. A01K 1/0356 119/702 |
| 8,561,575 B2* | 10/2013 | Ruffin .................. A01K 15/024 119/706 |
| 2006/0042560 A1* | 3/2006 | Novak ................. A01K 15/024 119/706 |
| 2007/0221720 A1* | 9/2007 | Nyeboer ............ B65D 11/1893 229/199 |
| 2007/0221721 A1* | 9/2007 | Bradford ............ B65D 11/1893 229/199 |

* cited by examiner

*Primary Examiner* — David J Parsley
*Assistant Examiner* — Danielle A Clerkley
(74) *Attorney, Agent, or Firm* — Muncy, Geissler, Olds & Lowe, P.C.

(57) ABSTRACT

The present invention provides a scarfing type scratching pad, including a base board which includes a plurality of salients, a plurality of side boards which includes a plurality of salients and recess holes and a plurality of top boards which have a plurality of recess holes. A three-dimensional shape is created with the salients of the base board sequentially going through the recess holes of the side boards and the recess holes of the top boards, and also the salients of the side boards sequentially going through the recess holes of the top boards. By this invention, it provides a scarfing type scratching pad that can let the cats play, rest, sleep and keep their claws honed and this pad also have functions of collecting cats' hair and scratching confetti.

10 Claims, 4 Drawing Sheets

SCARFING TYPE SCRATCHING PAD

CROSS-REFERENCE TO RELATED APPLICATIONS

This application claims priority to Taiwan Patent Application No. 104211088, filed Jul. 9, 2015, the content of which are hereby incorporated by reference in their entirety.

FIELD OF THE INVENTION

The present invention relates to a scratching pad, particularly relates to a scarfing type scratching pad.

BACKGROUND OF THE INVENTION

In today's society, pets (such as cats, dogs, rabbits, etc.) has been seen as key members of the family, rather than pure playmates of the family. Thus, pet owners are willing to spend a lot of money on buying pet products, such as: pet food, pet clothes, pet houses, pet cleaning supplies and pet medical supplies to ensure pets can be healthy, sleep well and have a great time, etc. However, most pets inherently have a habit of grinding their claws so that they can rid of their aging skin off. Pets get rid of their aging skin by grinding their claws. However, if pets grind their claws by using home furnishings, such as furniture, electrical wires and any fragile items, it may damage all home furnishings, furthermore, it might threaten pets' life.

Nowadays, scratching pads in markets only provide a simple function for pets to grind their claws. However, with this open structure design of cat scratching pads always make home environment messy as the confetti after cats' scratching is all over the place. Also, this kind of open structure design is not going to attract pets' attention for long and they may damage home furnishings as well. Therefore, it is necessary to design and provide comfortable and safe scratching pads for cats to grind their claws, play, rest and sleep and also provide easy scratching pads for pet owners to clean up the confetti as well.

SUMMARY OF THE INVENTION

Accordingly, the present invention provides a cat scratching pad, particularly, a scarfing type scratching pad to solve these previous technical problems mentioned above Accordingly, to solve the previous technical problems, the present invention provides a scarfing type scratching pad, which includes a base board which has a first surface, and a second surface which is opposite to the first surface, and the base board also has a first side, a second side, a third side, and a fourth side, in which these sides are scarfed to the first surface and the second surface. The first side faces to the second side and the third side faces to the fourth side. The first side, the second side, the third side and the fourth side all have a plurality of salients. Each the plurality of side boards has a first surface, and a second surface which is opposite to the first surface, and a first side, a second side, a third side, and a fourth side are all scarfed to the first surface and the second surface. The first side faces to the second side and the third side faces to the fourth side. The third side is scarfed to the second side and the fourth side. The first side has multiple salients going through from the first surface and the second surface. The second side and the fourth side both have multiple salients. Also, a plurality of top boards all have a first surface, and a second surface which is opposite to the first surface, and each top board has a first side, a second side, a third side, and a fourth side, in which these sides are scarfed to the first surface and the second surface. The first side faces to the second side and the third side faces to the fourth side. The first side, the second side and the third side all have a plurality of recess holes going through from the first surface and the second surface; wherein, the salients of the first side of the base board and the second side of the base board. sequentially go through the recess holes of the first side of the side board. The second side of the side board and the fourth side of the side board sequentially go through the recess holes of the second side of the top board and the first side of the top board. The salients of the third of the base board and the fourth side of the base board sequentially go through the recess holes of the third side of the top board and by doing this so as to a cubical shape can be formed.

The purpose of this invention is to grind aging skin off of pets' claws.

Another purpose of this invention is to collect pets' hair and confetti after cats' scratching as the design of this invention is fully wrapped design. Therefore, when pets rolling and grinding inside this invention, scarfing type scratching pad, hair falling off from pets can be collected, therefore, the home environment is not going to be messy and pet owners just need to clean and wipe the floor by using vacuums.

One more purpose of this invention is to provide a place for pets to play relax, rest and sleep. Since arc shape design is applied in this invention, when pets are rolling and playing inside this invention, scarfing type scratching pad, they can enjoy the rocking feeling inside this scarfing type scratching pads. Also, the pet owners can interact with their pets and furthermore, pets can relax fully inside the scratching pads.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

Below is detailed description of drawings and specific embodiments. According to the description and what are claimed listing below, the advantages and features of this invention would be more clear. It should be noted that the drawings specified here are all very simple and do not apply precise ratio. They are just facilitating to descript more details about this invention.

Figure 1:
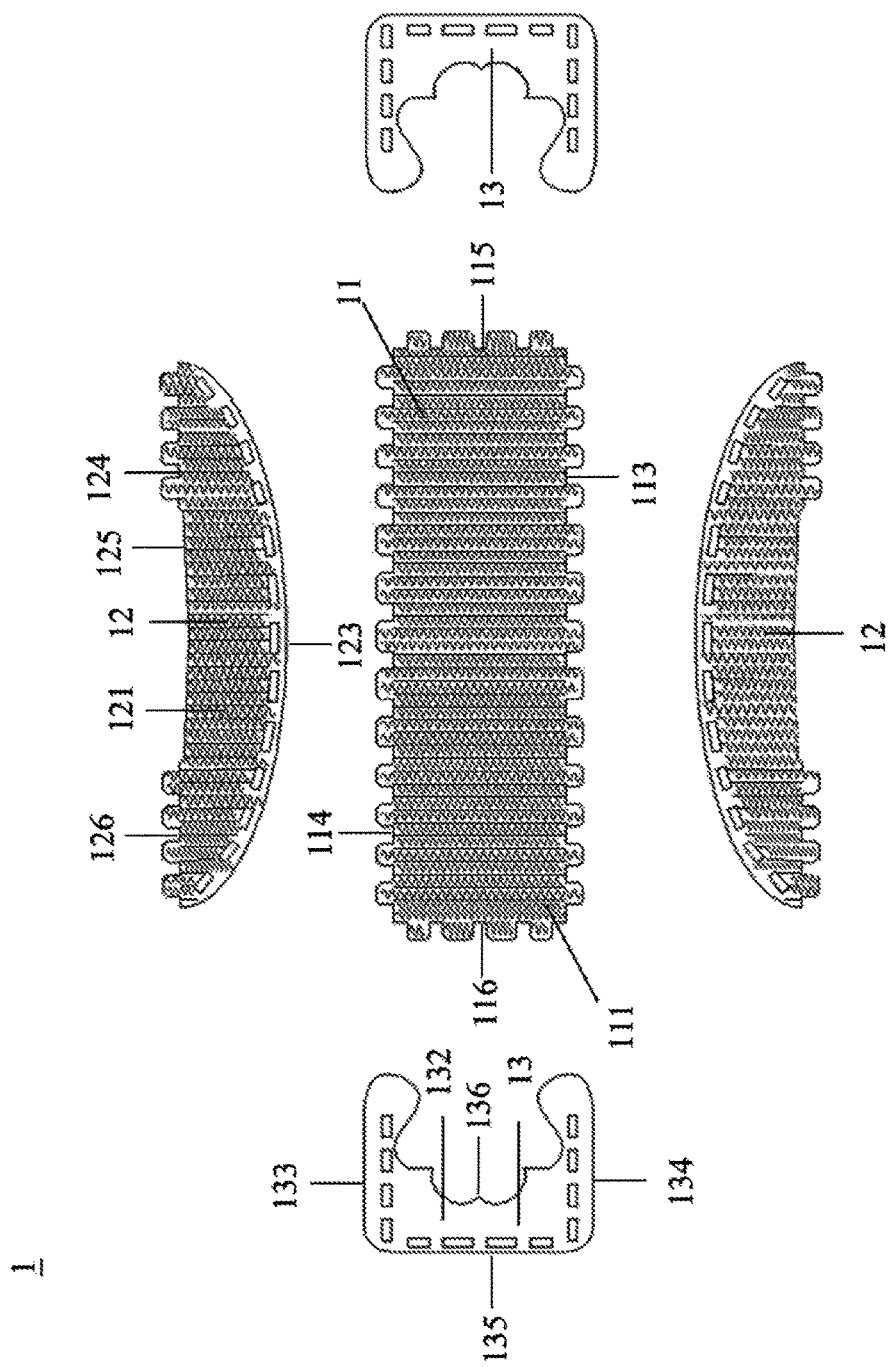
FIG. 1 is a front schematic view of all parts of this invention, scarfing type scratching pad.
Figure 2:
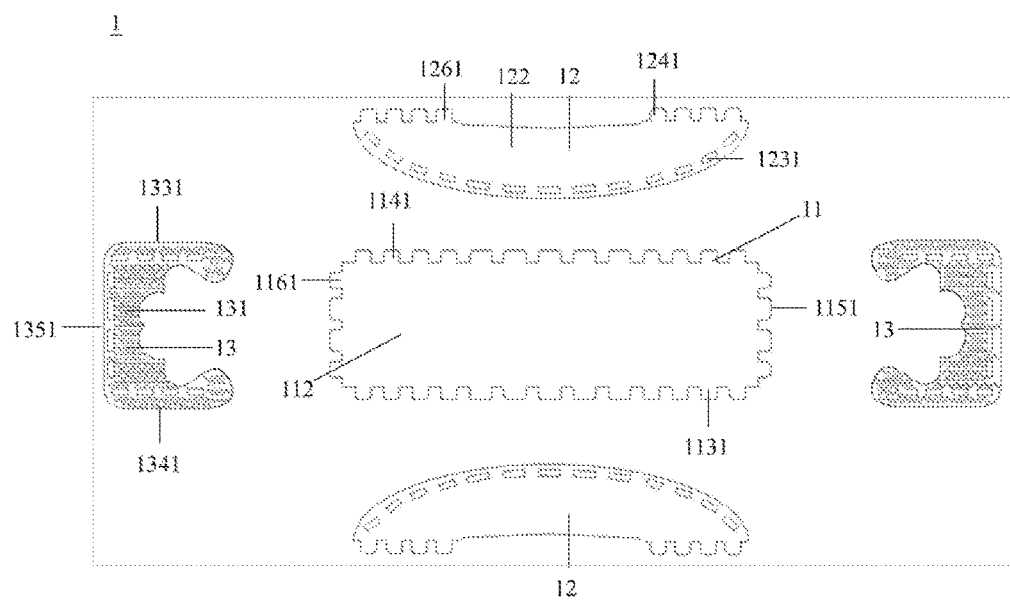
FIG. 2 is a back schematic view of all parts of this invention, scarfing type scratching pad.

Firstly, please refer to FIG. 1 and FIG. 2 at the same time. FIG. 1 is a front schematic view of all parts of the scarfing type scratching pad of this invention. FIG. 2 is a hack schematic view of all parts of scarfing type scratching pad of this invention. As shown on FIG. 1 and FIG. 2, the present invention provides a scarfing type scratching pad 1, which includes a base board 11, which has a first surface 111 and a second surface 112 which is opposite to the first surface 111, and a first side 113, a second side 114, a third side 115, and a fourth side 116, in which these sides are scarfed to the first surface 111 and the second surface 112. The first side 113 faces to the second side 114 and the third side 115 faces to the fourth side 116. The first side 113, the second side 114, the third side 115 and the fourth side 116 all have a plurality of salients 1131, 1141, 1151, 1161. A plurality of side boards 12, and each of the plurality of side boards 12 has the first surface 121 and a second surface 122 which is opposite to the first surface 121, and the side board also has a first side 123, a second side 124, a third side 125, and a fourth side 126, and these sides are scarfed to the first surface 121 and the second surface 122. The first side 123 faces to the second side 124 and the third side 125 faces to the fourth side 126. The third side 125 is scarfed to the second side 124 and the fourth side 126. The first side 123 has a plurality of recess holes 1231 going through from the first surface 121 and the second surface 122. The second side 124 and the fourth side 126 both have a plurality of salients 1241, 1261. Also, a plurality of top boards 13, and each of the plurality of top boards 13 has a first surface 131 and a second surface 132 which is opposite to the first surface 131, and the top board also has a first side 133, a second side 134, a third side 135, and a fourth side 136, and these sides are scarfed to the first surface 131 and the second surface 132. The first side faces 133 to the second side 134 and the third side 135 faces to the fourth side 136. The first side 133, the second side 134 and the third side 135 all have a plurality of recess holes 1331, 1341, 1351 going through from the first surface 131 and the second surface 132.

Wherein, the length of the first side 113 of the base board 11 is equal to the length of the second side 114 of the base board 11. The length of the third side 115 of the base board 11 is equal to the length of the fourth side 116 of the base board 11. The length of the first side 113 of the base board 11 is greater than the length of the third side 115 of the base board 11. The length of the first side 113 of the base board 11 is equal to the length of the first side 123 of the side board 12. The number of the salients 1131, 1141 of the first side 113 of the base board 11 and the second side 114 of the base board 11 are equal to the number of recess holes 1231 of the first side 123 of the side board 12; the number of the salients 1151, 1161 of the third side 115 of the base board 11 and the fourth side 116 of the base board 11 are equal to the number of recess holes 1351 of the third side 135 of the top board 13. The number of the salients 1241, 1261 of the second side 124 of the side board 12 and the fourth side 126 of the side board 12 are equal to the number of recess holes 1341, 1331 of the second side 134 of the top board 13 and the first side 133 of the top board 13.

The better material for the base board 11, side board 12 and top board 13 of the scarfing type scratching pad of the present invention is corrugated paper, but it is not to be limited herein.

The first surface 111 of the base board 11, the first surface 121 of the side board 12 and the first surface 131 of the top board 13 of the scarfing type scratching pad of the present invention is either wavy surface or honeycomb surface, but it is not to be limited herein.

The better shape for the salients 1131, 1141, 1151, 1161, 1241, 1261 of the scarfing type scratching pad of the present invention, is either arc shape or cone shape, but it is not to be limited herein.

The better shape for the first side 123 of the side board 12 of the scarfing type scratching pad of this invention is arc shape and the third side 125 of the side board 12 is concave arcuate shape, but it is not to be limited.

The better shape of the fourth side 136 of the top board 13 of the scarfing type scratching pad of the present invention is cat claw shape, but it is not to be limited.

The better cutting tool for the base board 11, the side board 12 and the top board 13 of the scarfing type scratching pad of the present invention is steel blades.

Figure 3:
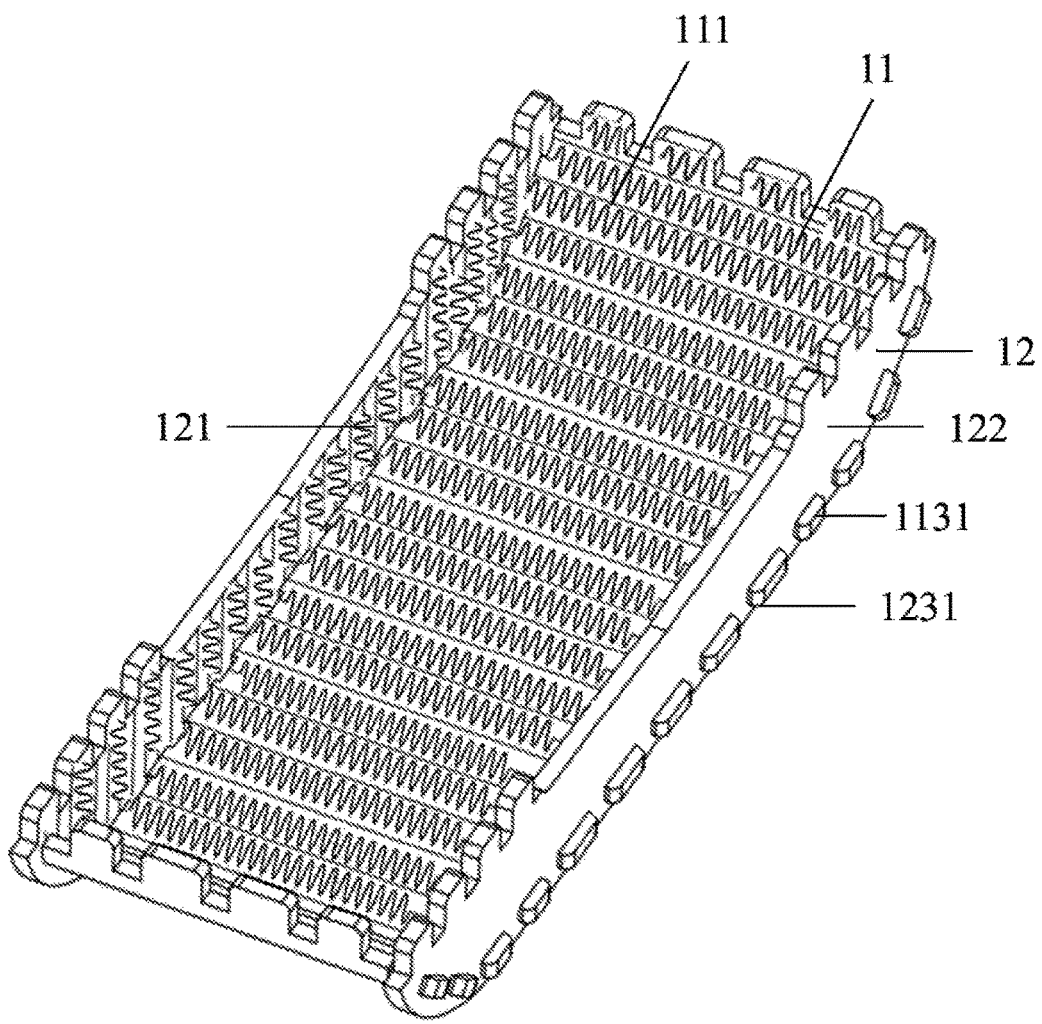
FIG. 3 is a perspective view after assembling a base board and side boards of this invention, scarfing type scratching pad.

Please continue referring to FIG. 3, a perspective view after assembling a base board and side boards of the scarfing type scratching pad of the present invention. As shown on FIG. 3, the salients 1131 of the first side 113 of the base board 11 sequentially go through the recess holeS 1231 of the first side 123 of the side board 12; Same as above, the salients 1141 (not shown) of the second side 114 of the base board 11 sequentially go through the recess holes 1231 of the first side 123 of the side board 12.

Figure 4:
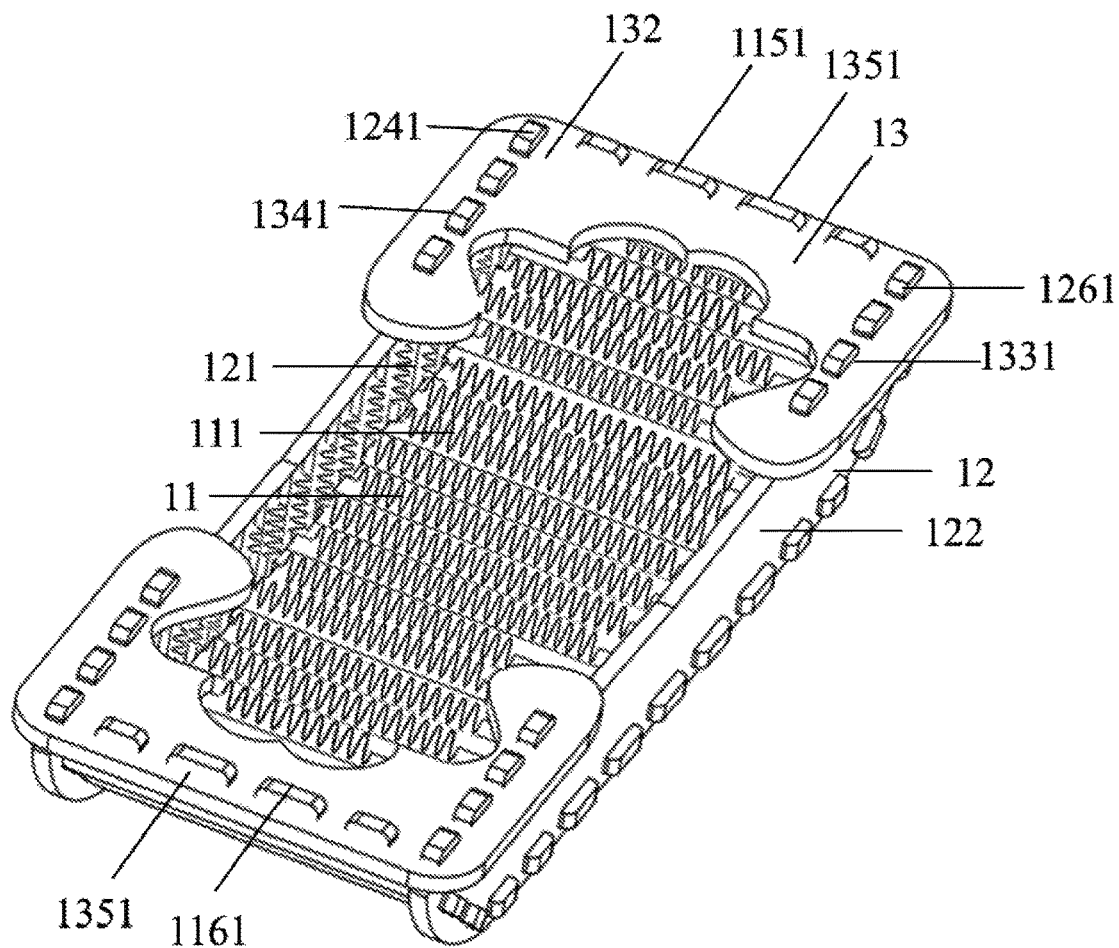
FIG. 4 is a perspective view after assembling all parts of this invention, scarfing type scratching pad.

Please continue referring to FIG. 4, a perspective view after assembling all parts of the scarfing type scratching pad of the present invention. As shown on FIG. 4, the salients 1241 of the second side 124 of the side board 12 sequentially go through the recess holes 1341 of the second side 134 of the top board 13; the salients 1151 of the third side 115 of the base board 11 sequentially go through the recess holes 1351 of the third side 135 of the top board 13. The salients 1261 of the fourth side 126 of the side board 12 sequentially go through the recess holes 1331 of the first side 133 of the top board 13. The salients 1161 of the fourth side 116 of the base board 11 sequentially go through the recess holes 1351 of the third side 135 of the top board 13. By combining the base board 11, side boards 12 and top boards 13 mentioned above, a three-dimension shape can be formed.

In the scarfing type scratching pad of the present invention, the first surface 121 of the side board 12 faces to each other and the first surface 131 of the top board 13 faces to the first surface 111 of the base board 11.

The shape of the scarfing type scratching pad of the present invention, is a three-dimension boat shape, but it is not to be limited.

Though the better sample of this invention is shown as above, but not limit to it. The technicians who are familiar with the techniques that belonged to this area and the techniques within the spirits and the scopes of this invention may have some adjustments and changes, therefore, the scopes of this invention must be based on "WHAT IS CLAIMED" below.

What is claimed is:

1. A scarfing type scratching pad, comprises:
a base board, the base board having a first surface and a second surface which is opposite to the first surface, and the base board also having a first side, a second side, a third side, and a fourth side, wherein, of the base board, these sides extend from the first surface to the second surface of the base board, wherein, of the base board, the first side faces to the second side and the third side faces to the fourth side, in which, of the base board, the first side, the second side, the third side and the fourth side all having a plurality of salients;
a plurality of side boards, the plurality of side boards having a first surface and a second surface which is opposite to the first surface, and the plurality of side boards also includes a first side, a second side, a third side, and a fourth side, wherein these side boards extend from the first surface to the second surface of the plurality of side boards, wherein, of the plurality of side boards, the first side faces to the second side and the third side faces to the fourth side, in which the third side of the plurality of side boards extends from the second side to the fourth side, in which the first side of the plurality of side boards having a plurality of salients going through from the first surface and the second surface of the plurality of side boards, in which the second side and the fourth side of the plurality of side boards both having a plurality of salients; and a plurality of top boards, each the plurality of top boards includes a first surface and a second surface which is opposite to the first surface, and the top board also has a first side, a second side, a third side, and a fourth side, wherein these sides extend from the first surface and the second surface of the plurality of top boards, wherein, of the plurality of top boards, the first side faces to the second side and the third side faces to the fourth side, in which the first side, the second side and the third side of the plurality of top boards all having a plurality of recess holes going through from the first surface and the second surface of the plurality of top boards;

wherein, the plurality of salients of the first side of the base board and the second side of the base board sequentially go through the plurality of recess holes of the first side of the side board, the plurality of salients the second side of the side board and the fourth side of the side board sequentially go through the plurality of recess holes of the plurality of second side of the top board and the first side of the top board, and the plurality of salients of the third side of the base board and the fourth side of the base board sequentially go through the plurality of recess holes of the third side of the top board and a three-dimensional shape can be formed.

2. The scarfing type scratching pad of claim 1, wherein the material of the base board, the side boards, and the top boards is corrugated paper.

3. The scarfing type scratching pad of claim 1, wherein the first surface of each side board faces to each other and the first surface of each top board faces to the first surface of the base board.

4. The scarfing type scratching pad of claim 1, wherein the shape of the first surface of the base board, the first surface of each side board, the first surface of each top board are one of wavy and honeycomb.

5. The scarfing type scratching pad of claim 1, wherein the length of the first side of the base board is equal to the second side of the base board, the length of the third side of the base board is equal to the fourth side of the base board, the length of the first side of the base board is greater than the third side of the base board, and the length of the first side of the base board is equal to the first side of each side board.

6. The scarfing type scratching pad of claim 1, wherein the number of salients of the first side of the side board and the second side of the base board are equal to the number of recess holes of the first side of each side board, the number of salients of the third side of the base board and the fourth side of the base board are equal to the number of recess holes of the third side of each top board, the number of salients of the second side of each side board and the fourth side of each side board are equal to the number of recess holes of the first side of each top board and the second side of each top board.

7. The scarfing type scratching pad of claim 1, wherein the first side of each side board is arc shape.

8. The scarfing type scratching pad of claim 1, wherein the fourth side of each top board is cat claw shape.

9. The scarfing type scratching pad of claim 1, wherein the shape of the three-dimensional shape is a boat shape.

10. The scarfing type scratching pad of claim 1, wherein a cutter for the base board, side boards, and top boards is a stainless blade.

* * * * *